United States Patent [19]
Edman

[11] 3,806,775
[45] Apr. 23, 1974

[54] POLYOLEFIN CAPACITOR CONSTRUCTION

[75] Inventor: James Richard Edman, Circleville, Ohio

[73] Assignee: E. I. du Pont de Nemours and Company, Wilmington, Del.

[22] Filed: Oct. 19, 1971

[21] Appl. No.: 190,576

[52] U.S. Cl. ............................... 317/258, 317/260
[51] Int. Cl. ............................................. H01g 3/175
[58] Field of Search ............. 161/402, 216; 252/63; 317/258, 261, 260

[56] References Cited
UNITED STATES PATENTS

| | | | |
|---|---|---|---|
| 3,540,979 | 11/1970 | Hughes | 161/255 |
| 2,864,982 | 12/1958 | Ruscetta et al. | 161/216 |
| 3,320,115 | 5/1967 | Reid et al. | 161/216 |
| 3,343,663 | 9/1967 | Seidler | 161/216 |
| 3,348,995 | 10/1967 | Baker et al. | 161/216 |
| 3,542,605 | 11/1970 | Harvey | 161/216 |
| 3,530,561 | 9/1970 | Cox | 29/25.42 |
| 3,623,943 | 11/1971 | Altenpohl et al. | 161/216 |
| 3,634,546 | 1/1972 | Hagemeyer et al. | 161/216 |

FOREIGN PATENTS OR APPLICATIONS 2,061,728  6/1971  Germany

*Primary Examiner*—E. A. Goldberg

[57] ABSTRACT

Capacitor construction which permits more efficient impregnation with chlorinated aromatics comprising metal layers interspersed with layers of polyolefin, wherein the polyolefin comprises a laminate having at least two layers.

6 Claims, 1 Drawing Figure

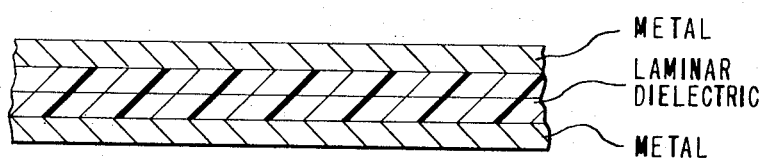

POLYOLEFIN CAPACITOR CONSTRUCTION

BACKGROUND OF THE INVENTION

In the preparation of capacitors having alternating layers of metal foil and dielectric film, it has previously been found that two or more layers of dielectric film between layers of metal are desirable to improve capacitor performance. The two layers of dielectric film substantially diminish the possibility of a conductive impurity or a pinhole in one layer of film diminishing the quality of insulation between two metal electrodes.

An additional difficulty encountered in capacitor constructions of this type results from the entrapment of small quantities of air between layers of the capacitor. These small air pockets provide a medium for corona discharge from the electrodes, which substantially diminishes the effective life of the capacitor. In the past, the problem of interfacial air pockets has been solved past, impregnating the capacitor with a dielectric liquid between the layers of the capacitor. While dielectric liquids of the type generally used readily permeate between the dielectric film and the metal foil, difficulty has been encountered in getting complete permeation of the liquid between multiple layers of dielectric. The polyolefin films commonly used as dielectric material exhibit some tendency to adhere to each other, thereby preventing complete permeation by the dielectric liquid, and retaining some air between layers. Various solutions to this problem have previously been proposed, such as providing a wicking material between the layers of dielectric or applying the impregnating fluid at elevated temperatures.

SUMMARY OF THE INVENTION

The present invention provides a capacitor construction and method for its preparation that eliminates the need for impregnation between dielectric layers, yet which is characterized by a high degree of reliability and simplicity of manufacture.

Specifically, the instant invention provides an improvement in capacitors of the type impregnated with dielectric liquid and comprising alternate layers of metal and polyolefin dielectric and in which each layer of dielectric comprises at least two lamina, which improvement comprises a bonded interface between each two dielectric lamina.

BRIEF DESCRIPTION OF THE DRAWING

The FIGURE is a cross-sectional illustration of a representative capacitor of the invention.

DETAILED DESCRIPTION OF THE INVENTION

Dielectric polymers that can be used in the instant invention between metal layers include those prepared from polyolefins such as polyethylene and polypropylene. The polymeric film can be used substantially as-cast or in a uniaxially or biaxially oriented condition.

The film layers can be laminated by either adhesive or nonadhesive laminating techniques to form the required void-free boundary between the film plies. For example, the films can be laminated by coextruding two or more films in a heated condition, or coating a previously prepared film with a fresh layer of the same resin. One method of lamination particularly preferred in the present invention involves melt coating an oriented linear polypropylene film with a similar composition of polypropylene. Other coating techniques that can be used in accordance with the instant invention include the application of a solution or dispersion of polymer onto a preformed film by spraying or conventional coating application techniques. By way of specific illustration, polypropylene resin can be extruded at a temperature of about 255° C. onto a preformed polypropylene film maintained at a temperature of about from 50° to 80°C. A second film can then be pressed against the hot polypropylene melt using a nip roll to form a laminar structure. Alternatively, the surfaces of two preformed films can be heated until tacky, generally around 162°C., and then nipped together to form the laminar structure. Using adhesive laminating techniques, an adhesive can be applied either from organic solvent or water to the surface of one film, the solvent or water evaporated, and the film bonded to a second preformed film by passing through a nip roll.

The assembly of the capacitors, except for the lamination of the multiple dielectric sheets, is carried out in the usual manner with a metal foil, such as aluminum, copper, tantalum and the like. If desired, the laminar dielectric material in contact with the metal surface can be subjected to pretreatment such as roughening to improve the impregnation of dielectric liquid between the dielectric-metal interface. After assembly of the capacitor layers, the capacitor is impregnated with a dielectric liquid such as chlorinated aromatics, e.g., trichlorodiphenyl; halocarbons, such as "Freon E5" commercially available from E. I. du Pont de Nemours and Co.; silicone oils, such as "Dow Corning Oil 200;" silicate esters; and mineral and polyolefin oils. The dielectric liquid permeates, in the conventional manner, the dielectric-foil interface to fill air pockets.

The constructions of the present invention present several advantages over capacitor assemblies previously used in the art. For example, the "wicking" layer between the layers of the dielectric material previously used required an extended drying step before impregnation of the capacitor structure could be carried out. In addition, the wicking decreased dielectric strength of the capacitor and increased the dissipation factor. Accordingly, the provision of a laminar dielectric layer in the present capacitors provides the reliability and long life associated with multiple dielectric layers, but avoids the laborious manufacturing procedures normally associated with multiple dielectric layers, eliminating completely the intermediate wicking layer that was previously necessary in the impregnation process. The capacitors of the present invention also provide an advantage over capacitors containing a single, thicker layer of dielectric between the metal layers. In such capacitors, the single, unlaminated dielectric increases the possibility of a defect such as a void or conductive impurity extending through the full thickness of the dielectric layer.

The present invention is further illustrated by the following specific examples. Several films and film laminates were prepared for use in the Examples from linear polypropylene having a melt index of 3, an isotacticity of 95 percent and low catalyst residue.

Sample A had a thickness of 0.5 mil and was oriented substantially in accordance with Goldman, et al., U.S. Pat. No. 3,141,912.

Sample B had a thickness of 0.75 mil and was oriented substantially in accordance with Example 1 of Goldman, et al., U.S. Pat. No. 3,141,912.

Sample C had a thickness of 1.25 mils and consisted of Sample B film, melt coated with a 0.5 mil thickness of the same polypropylene by melt extruding the coating material onto a quench drum maintained at 50°C. and subsequently nipping the coating material to the Sample B film with rubber rolls to obtain an integral, bonded interface.

Sample D had a thickness of 1.25 mils and consisted of a single layer of polypropylene cast onto a quench drum maintained at 50°C.

Sample E had a thickness of 1.0 mil and was prepared by casting a single layer of the polypropylene onto a quench drum maintained at 50°C.

Sample F had a thickness of 1.1 mils and was prepared by melt extruding a 0.1 mil coating of polypropylene onto one Sample A film followed by nipping with a second Sample A to form a bonded, void-free laminate.

EXAMPLES 1–5

Five capacitors were prepared, using several of the film samples indicated above and winding the film with aluminum foil. Single sheets of each film sample separated the foil and the capacitor. Termination of the capacitor was effected with tabs, and the extended film had a five-eighths inch margin. The capacitors were 1.1 inches in diameter and had capacitances of 0.1 to 0.4 microfarads. The DC breakdown strength was measured by conventional means and the results, in volts, are tabulated below.

| Example | Separation Film | Separation Film Thickness (mils) | DC Breakdown Voltage |
|---|---|---|---|
| 1 | C | 1.25 | 7900 |
| 2 (Control) | D | 1.25 | 6900 |
| 3 (Control) | B | 0.75 | 5700 |
| 4 | F | 1.1 | 6800 |
| 5 (Control) | E | 1.00 | 5400 |

EXAMPLES 6–8

In Examples 6–8, dry capacitors were prepared similar to those in Examples 1–5. The separating dielectric film, in Examples 6, 7 and 8, respectively, were the samples indicated in the table, including, in one case, a paper interlayer of the type used to promote wicking of an impregnating fluid. The capacitors were tested for failure at 6,000 volts DC for 10 seconds and the results are tabulated below.

| Example | Dielectric Interlayer | Thickness (mils) | Failure Rate |
|---|---|---|---|
| 6 | C | 1.25 | 2 of 40 |
| 7 (Control) | A/Paper/A | 1.50 | 3 of 40 |
| 8 (Control) | D | 1.25 | 23 of 40 |

EXAMPLES 9–12

Capacitors having a capacitance of 0.1 microfarad were prepared using various dielectric interlayers including, in control Examples 11 and 12, respectively, unlaminated dual film layers with and without a wicking paper interlayer. All capacitors were placed in a vacuum oven for 16 hours at 85°C. and 50 microns to remove moisture. The temperature was reduced to 50°C. and the capacitors were impregnated with Arochlor® 1242 for the impregnation period indicated. The capacitors were moved from the chamber for testing. The corona starting voltage for alternating current (CSV) was measured in accordance with ASTM-D-1868. A higher CSV is indicative of better performance and longevity of the capacitor. The power factor is measured at 60 cycles AC, 85°C. and 600 volts. A low power factor is desirable and indicative of an efficient capacitor. The results of the testing of the capacitors of Examples 9–12 is summarized in the table below.

| Example | Dielectric Interlayer | Interlayer Thickness (mils) | Impregnation Hours | CSV | Power Factor |
|---|---|---|---|---|---|
| 9 | C | 1.25 | 22 | >2,006 | <0.025 |
| 10 | F | 1.1 | 43 | >2,050 | |
| 11 (Control) | A/A | 1.0 | 48 | 600–1,450 | |
| 12 (Control) | A/Paper/A | 1.5 | 24 | >2,050 | 0.07% |

The test results indicate that two unlaminated layers of dielectric, as in Example 11, even with twice the impregnation time, exhibit poor impregnation as compared with either of the laminated dielectric interlayers of Examples 9 and 10 of the present invention. This is indicated by the much lower CSV, in turn indicative of the presence of air between the layers of dielectric. While the impregnation can be facilitated by the paper interlayer between the layers of dielectric as illustrated in Example 12, the paper interlayer, in addition to the inconvenience of such an additional layer in the preparation of the capacitor, results in a substantially poorer power factor.

I claim:

1. In an electrical capacitor of the type impregnated with dielectric liquid and comprising alternate layers of metal foil and polyolefin dielectric in which each layer of dielectric comprises at least two laminal, the improvement wherein each dielectric lamina is bonded to each adjacent dielectric lamina.

2. A capacitor of claim 1 in which the polyolefin lamina are bonded by adhesive means.

3. A capacitor of claim 1 wherein the polyolefin lamina are bonded by nonadhesive means.

4. A capacitor of claim 1 wherein the polyolefin consists essentially of polypropylene.

5. A capacitor of claim 4 in which the polypropylene consists essentially of linear polypropylene.

6. A capacitor of claim 1 in which the polyolefin consists essentially of polyethylene.

* * * * *